Figure 1:
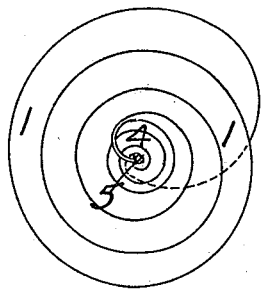
Figure 2:
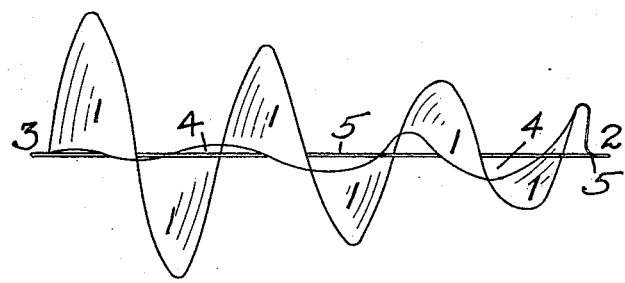
Figure 3:
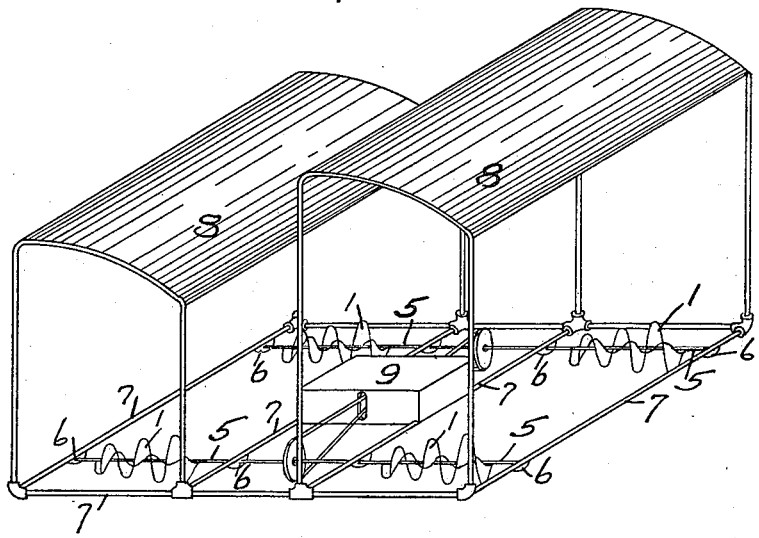

F. DE KONING.
SCREW PROPELLER.
APPLICATION FILED NOV. 7, 1911.

1,064,695.

Patented June 10, 1913.

WITNESSES:
M. M. Faucher
Marie E. McLean

INVENTOR
Frank De Koning
BY
Edw. Baulinkly
HIS ATTORNEY

COLUMBIA PLANOGRAPH CO., WASHINGTON, D. C.

UNITED STATES PATENT OFFICE.

FRANK DE KONING, OF FREEPORT, NEW YORK.

SCREW-PROPELLER.

1,064,695.      Specification of Letters Patent.      Patented June 10, 1913.

Application filed November 7, 1911. Serial No. 659,008.

*To all whom it may concern:*

Be it known that I, FRANK DE KONING, residing in Freeport, Long Island, county of Nassau, State of New York, have invented certain new and useful Improvements in Screw-Propellers, of which the following is a specification.

My invention relates to screw propellers of the spiral type with helices gradually increasing and an open conical core; and has for its object the production of a propeller that will form a compression and distribution of air at right angles to its axis.

The foregoing and other features of my invention will now be described in connection with the accompanying one sheet of drawings forming part of this specification, in which I have represented my propeller in its preferred form, after which I shall point out more particularly in the claims, those features which I believe to be new and of my own invention.

Figure I is an end view of my propeller, Fig. II is a side view at right angles to that shown in Fig. I, Fig. III shows an application to an aeroplane.

In my invention I provide a blade 1 increasing in width of surface as the diameter of the helix increases, from the small end 2 to the large end 3, and having an open conical core 4 the large diameter of which is at the small end 2 and proportionately decreasing as it approaches the large end 3. This propeller may be secured to a shaft 5 along its central axis by any known means, mounted in suitable bearings 6 in a framework 7 of an aeroplane 8 and may be driven by a motor 9. As no claim is made to the aeroplane a further description is unnecessary. It will be readily understood that any combination of supporting planes may be used as well as any shape or combination of planes.

The object of the open conical center is to provide a suction inlet through which fluid may flow into the center of the propeller for distribution between the blades at right angles to the central axis, which passage shall have a caliber at each point to agree with the volume of the flow required at that point, the aim being to cause all the fluid to be forced centrifugally from the propeller and to permit little or none of it to pass entirely through it along its axis.

I claim—

1. A propeller blade increasing in width and spirally and conically wound forming an open conical center, the narrow end of the blade commencing at the large diameter of the conical center.

2. A propeller blade conically and spirally wound forming an open conical center and supported by a shaft, the said blade tapering from its small end, increasing in width as it approaches the small diameter of the open conical center.

3. In a propeller of the class described a spiral blade of varying width having its helix increasing gradually in diameter provided with an open conical center increasing in diameter inversely with the helix.

4. A propeller blade conically and spirally wound forming an open conical center the outside and inside diameters of the blade thus coiled varying inversely.

This specification signed and witnessed, at room 1312, West Street Bldg., in the city of New York, this sixth day of November A. D., 1911.

FRANK DE KONING.

In the presence of—
  EDW. VAN WINKLE,
  M. E. MCLEAN.

---

Copies of this patent may be obtained for five cents each, by addressing the "Commissioner of Patents, Washington, D. C."